United States Patent
Pan

(10) Patent No.: US 7,436,638 B1
(45) Date of Patent: *Oct. 14, 2008

(54) FERROMAGNETIC PINNING STRUCTURE INCLUDING A FIRST SECTION ANTIFERROMAGNETICALLY COUPLED TO A PINNED LAYER AND A SECOND SECTION ELONGATED RELATIVE TO THE FIRST SECTION IN A STRIPE HEIGHT DIRECTION

(75) Inventor: Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,861

(22) Filed: Sep. 18, 2007

Related U.S. Application Data

(62) Division of application No. 10/816,158, filed on Mar. 31, 2004, now Pat. No. 7,280,325.

(51) Int. Cl.
*G11B 5/39* (2006.01)
(52) U.S. Cl. ............. 360/324.11; 360/319; 360/324.12; 360/324.2
(58) Field of Classification Search ............. 360/324.11, 360/321, 324.12, 324.2, 319
See application file for complete search history.

(56) References Cited

U.S. PATENT DOCUMENTS

| | | | |
|---|---|---|---|
| 6,023,395 A | 2/2000 | Dill et al. | |
| 6,108,176 A * | 8/2000 | Yokoyama | 360/324.11 |
| 6,466,419 B1 | 10/2002 | Mao | |
| 7,092,221 B2 * | 8/2006 | Gill | 360/324.11 |
| 7,280,325 B1 * | 10/2007 | Pan | 360/324.12 |
| 2002/0024781 A1 | 2/2002 | Ooshima et al. | |
| 2002/0097540 A1 | 7/2002 | Hayashi et al. | |
| 2002/0167767 A1 | 11/2002 | Jayasekara | |
| 2002/0167768 A1 | 11/2002 | Fontana, Jr. et al. | |

OTHER PUBLICATIONS

Childress et al., "Spin-Valve And Tunnel-Valve Structures With In Situ In-Stack Bias", IEEE Transactions on Magnetics, vol. 38, No. 5, pp. 2286-2288, Sep. 2002.

\* cited by examiner

*Primary Examiner*—Craig A Renner
(74) *Attorney, Agent, or Firm*—Jonathan E. Prejean, Esq.

(57) ABSTRACT

A CPP magnetic sensor is disclosed with a ferromagnetic layer that extends in a first direction a first distance; a non-ferromagnetic spacer layer that adjoins the ferromagnetic layer and extends in the first direction a second distance that is substantially equal to the first distance; and a ferromagnetic structure that is separated from the ferromagnetic layer by the spacer layer, the ferromagnetic structure having a first section that extends in the first direction a third distance that is substantially equal to the second distance, the ferromagnetic structure having a second section that is disposed further than the first section from the spacer layer, the second section extending at least twice as far as the first section in the first direction. The ferromagnetic structure can be used for in-stack bias or pinning of free or pinned layers, respectively, and side shields can be provided for high areal density.

11 Claims, 6 Drawing Sheets

FERROMAGNETIC PINNING STRUCTURE INCLUDING A FIRST SECTION ANTIFERROMAGNETICALLY COUPLED TO A PINNED LAYER AND A SECOND SECTION ELONGATED RELATIVE TO THE FIRST SECTION IN A STRIPE HEIGHT DIRECTION

CROSS REFERENCE TO RELATED APPLICATIONS

This application is a divisional of U.S. patent application Ser. No. 10/816,158, filed Mar. 31, 2004, and is incorporated by reference herein its entirety.

TECHNICAL FIELD

This invention relates in general to magnetoresistive (MR) sensors for sensing external magnetic fields, such as read transducers for magnetic heads in information storage devices such as disk drives.

BACKGROUND

Magnetoresistive (MR) sensors typically include a pair of ferromagnetic layers separated by a thin nonferromagnetic "spacer" layer. One of the ferromagnetic layers usually has a magnetic moment that is fixed or "pinned" in direction despite provision of an external magnetic field that causes the magnetic moment of the other "free" ferromagnetic layer to rotate. The resistance to current flow through the nonmagnetic layer varies depending upon the relative orientation of the magnetic moments, and so the rotation of the free layer relative to the pinned layer can be used to sense the external field.

The above described sensor layers are typically formed between a pair of parallel, soft magnetic "shield" layers that extend in a track-width much further than the free layer. The shields intercept magnetic fields that are directed at the free layer from bits of a magnetized medium track that are not directly opposite to the free layer, allowing the closest bits of the track to be more easily sensed by the free layer.

Commercially available spin-valve sensors operate with electric current flowing along the plane of the spacer layer, and may be termed current-in-plane (CIP) sensors. Alternatively, current-perpendicular-to-plane (CPP) sensors are designed to have electric current flowing perpendicular to the plane of the spacer layer, typically between the pair of shields, so that the shields also serve as leads for the sensor. To increase storage densities, CPP sensors have been proposed with shields that are also located on each side of the free layer, so that the free layer does not sense signals from adjacent tracks.

An antiferromagnetic (AF) layer may be used to set the magnetization of the pinned layer. The free layer may have multiple magnetic domains especially near its edges, which can cause noise and reduce the magnetoresistive effect. For that reason, a biasing mechanism may be provided for the free layer that reduces edge effects. CIP sensors are typically biased by hard magnetic layers that are located next to the edges of the free layer. Such longitudinal biasing would interfere with side shields, and so a CPP sensor has been proposed that has an in-stack longitudinal bias layer that is pinned by a second AF layer. Setting the magnetization of the bias layer, however, may destabilize the magnetization of the pinned layer.

SUMMARY

In one embodiment, a magnetic structure has a ferromagnetic layer that extends in a first direction a first distance; a nonferromagnetic spacer layer that adjoins the ferromagnetic layer and extends in the first direction a second distance that is substantially equal to the first distance; and a ferromagnetic structure that is separated from the ferromagnetic layer by the spacer layer, the ferromagnetic structure having a first section that extends in the first direction a third distance that is substantially equal to the second distance, the ferromagnetic structure having a second section that is disposed further than the first section from the spacer layer, the second section extending at least twice as far as the first section in the first direction.

In one embodiment, the ferromagnetic layer can be a soft magnetic free layer for a CPP sensor, with the free layer separated from a ferromagnetic pinned layer by another nonferromagnetic spacer layer. In this case, the magnetic structure can serve as an in-stack bias structure for the free layer. In another embodiment, the ferromagnetic layer can be a pinned layer for a CPP sensor, with a soft magnetic free layer separated from the pinned layer by another nonferromagnetic spacer layer. In this case, the magnetic structure can serve as a pinning structure for the pinned layer, which may be coupled to the pinning structure by a subnanometer spacer layer of ruthenium (Ru) or the like. Another CPP sensor can have a first magnetic structure as described above that can serve as an in-stack bias structure for the free layer, and can have a second magnetic structure as described above that can serve as a pinning structure for the pinned layer. In any of these examples, the free layer has a magnetization that rotates in response to an applied magnetic field, and the pinned layer has a magnetization that is stable in response to the applied magnetic field.

DETAILED DESCRIPTION

Figure 1:
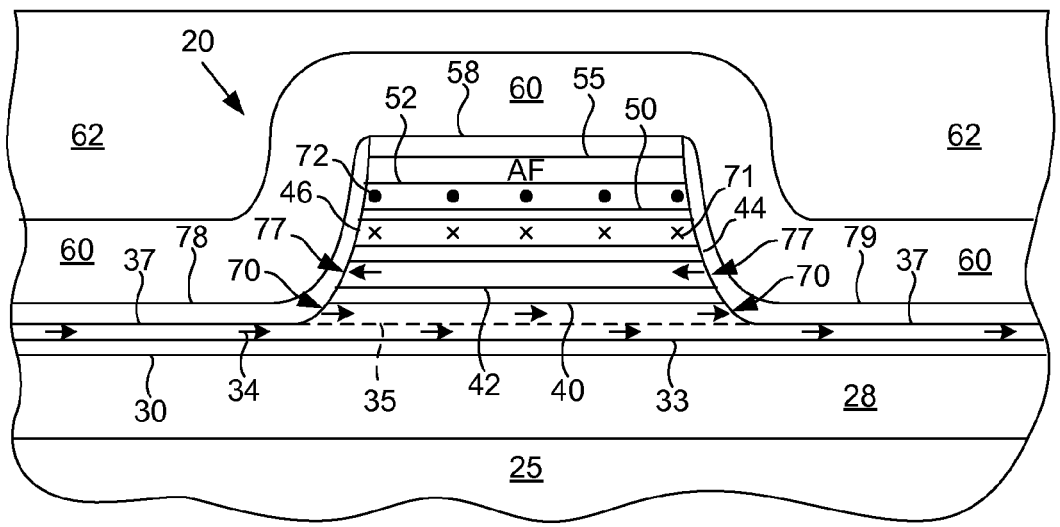
FIG. 1 is a cutaway cross-sectional view of a side shielded CPP sensor with a free layer that is biased by a ferromagnetic structure having a first section with edges that are magnetostatically coupled to the ends of the free layer, and a second section that extends well beyond the free layer in the track-width direction.

FIG. 1 is a cutaway cross-sectional view of a magnetic sensor 20 designed to have current flowing between a first soft magnetic shield 28 and a second soft magnetic shield 60, i.e., in a current perpendicular to plane (CPP) mode. The view of the sensor 20 is that which would be seen from an associated medium, looking through any thin protective coating that may cover the medium-facing surface. The second shield 60 overlaps a plurality of sensor layers including a soft magnetic free layer 42 to provide shielding for the free layer in a track-width as well as a track-length direction. The free layer 42 is biased by a ferromagnetic structure 33 having a first section 35 with edges 70 that are magnetostatically coupled to the ends 77 of the free layer, and a second section 37 that extends well beyond those edges in a track-width direction that is oriented generally sideways in FIG. 1. The elongated shape of the second section 37 geometrically stabilizes the magnetization of that section in the track-width direction, and reduces edge effects in the adjoining first section 35.

The sensor 20 has been formed in a number of thin film layers on a wafer substrate 25 along with thousands of other sensors, the substrate and layers diced to form individual sensors. The first shield 28 has been formed on the substrate 25 after the substrate has been polished and optionally covered with a surface layer, not shown. An electrically conductive, nonmagnetic layer 30 has been formed over the first shield 28, for example of copper (Cu), chromium (Cr), tantalum (Ta), other metals or alloys. The ferromagnetic structure 33 was formed as a layer atop the nonmagnetic layer 30, after which the first section 35 was defined by etching while the second section 37 was not trimmed by the etching. The ferromagnetic structure 33 may be made of hard magnetic material such as cobalt-chromium (CoCr), cobalt-chromium-platinum (CoCrPt), cobalt-chromium-platinum-tantalum (CoPtCrTa), etc., which was deposited at an elevated temperature in the presence of a magnetic field to impart a magnetic moment that is directed substantially in the track-width direction, as depicted by arrows 34. The hard magnetic material may be magnetized at lower temperature such as room temperature by imposing a magnetic field that exceeds the coercivity of the hard magnet. In an alternative embodiment the first section 35 and the second section 37 can be deposited as distinct layers. In this case, the first section may be formed of soft magnetic materials such as CoFe, NiFe, or other alloys or laminates, and the second section may be formed of hard magnetic materials such as CoCr, CoCrPt, CoPtCrTa, etc.

An electrically conductive, nonmagnetic spacer layer 40 has been formed atop the ferromagnetic structure 33, for example of copper (Cu), chromium (Cr), tantalum (Ta), other metals or alloys to a thickness that provides weak magnetostatic coupling between the first section 35 and the free layer 42, the thickness typically in a range between about one nanometer and fifty nanometers. The free layer 42 may have a track-width dimension and thickness that are similar to those of the first section 35, also to provide weak magnetostatic coupling between the layer 42 and the section 35.

A nonferromagnetic spacer layer 44 has been formed atop the free layer 42, and a ferromagnetic pinned layer 46 has been formed atop the spacer layer 44. The spacer layer 44 may be made of a dielectric material, such as alumina, silicon-dioxide or aluminum-nitride, that forms a spin dependent tunnel barrier, in which case the thickness of the spacer layer may be in a range between about five angstroms and ten angstroms. Alternatively, the spacer layer 44 may be made of electrically conductive material that forms a spin valve, in which case the thickness may be in a range between about two nanometers and twenty nanometers. The spacer layer 44 may instead be made of electrically resistive material, or heterogeneous materials that have conductive regions interspersed with resistive or insulating regions, in which case the thickness may be in a range between about one nanometer and twenty nanometers.

The ferromagnetic pinned layer 46 may be initialized by a magnetic field to impart a magnetic moment directed in a stripe-height direction, as indicated by crosses 71. Pinned layer 46 may be formed of soft magnetic materials such as CoFe, NiFe, etc., and may have a thickness that is in a range between about two nanometers and fifty nanometers. An electrically conductive, nonmagnetic exchange-coupling layer 50 has been formed, for example of ruthenium (Ru) to a subnanometer thickness, to strongly couple the pinned layer 46 to a hard magnetic pinning layer 52, which has a magnetic moment directed oppositely to that of the pinned layer, as indicated by dots 72. Materials that can be used for the exchange-coupling layer 50 include ruthenium (Ru), chromium (Cr), rhodium (Rh), iridium (Ir), copper (Cu), or alloys of these metals.

Pinning layer 52 may be formed of soft magnetic materials such as CoFe, NiFe, etc., with a moment that has a slightly different magnitude than that of pinned layer 46, to provide a nearly balanced overall moment for the antiparallel coupled sandwich structure. Alternatively, pinning layer 52 may have a lower coercivity than that of the bias layer structure 33, and may have its magnetic moment set with a magnetic field having a strength that is above the coercivity of the pinned layer 46 but below the coercivity of the bias layer structure. An antiferromagnetic (AF) layer 55, which may be formed, for example, of an alloy containing manganese (Mn), such as platinum-manganese (PtMn), adjoins the pinning layer 52 to stabilize the magnetization of the pinning layer and sandwich structure. The AF layer 55 may be heated to above its blocking temperature that is below the coercivity of the bias structure 33, before cooling in the presence of a magnetic field to pin the moment of the pinning layer 52 by exchange coupling, to set the magnetization of the pinned and pinning layers in directions perpendicular to that of the bias structure. An electrically conductive, nonmagnetic cap layer 58 has been formed, for example, of tantalum (Ta), to protect the previously formed layers and to magnetically isolate the AF layer 55 from the second shield 60.

An advantage of the having the free layer bias field set by the ferromagnetic bias structure 33, whereas the pinned layer bias is set by the AF layer 55, is that different mechanisms can be used to set the desired perpendicular magnetizations. The bias structure 33 magnetization can be set by a strong magnetic field that exceeds the coercivity of the bias structure, whereas the pinned layer magnetization can be set by a weak magnetic field and a temperature that is reduced from above the blocking temperature of the AF layer 55. These different mechanisms can performed in either order without disturbing the magnetization set by the other mechanism. These initialization mechanisms can be used to set the desired magnetizations at the wafer level, slider level, or even after the sensor has been placed into a disk drive, providing the possibility of re-initializing to improve yield.

After formation of the above-described layers, a lift-off mask was formed and the region not covered by the mask was removed by a highly anisotropic etch such as an ion beam etch (IBE) or reactive ion etch (RIE), to form a plateau-shaped stack of sensor layers. With the mask still present, insulating layers 78 and 79 were formed, for example of alumina or silicon dioxide, covering the bias layer structure 33 and the sides of the stack. The mask was then removed, along with any insulating material deposited atop the mask, and the second shield 60 was formed. Another layer of insulating material 62 was then formed and polished flat, after which an inductive write transducer may be formed. Note that the shields 28 and 60 may have a thickness on the order of one micron, and the shield-to-shield spacing, measured between outside surfaces of conductive layers 30 and 58, may be in a range between about two hundred nanometers and forty nanometers.

Figure 2:
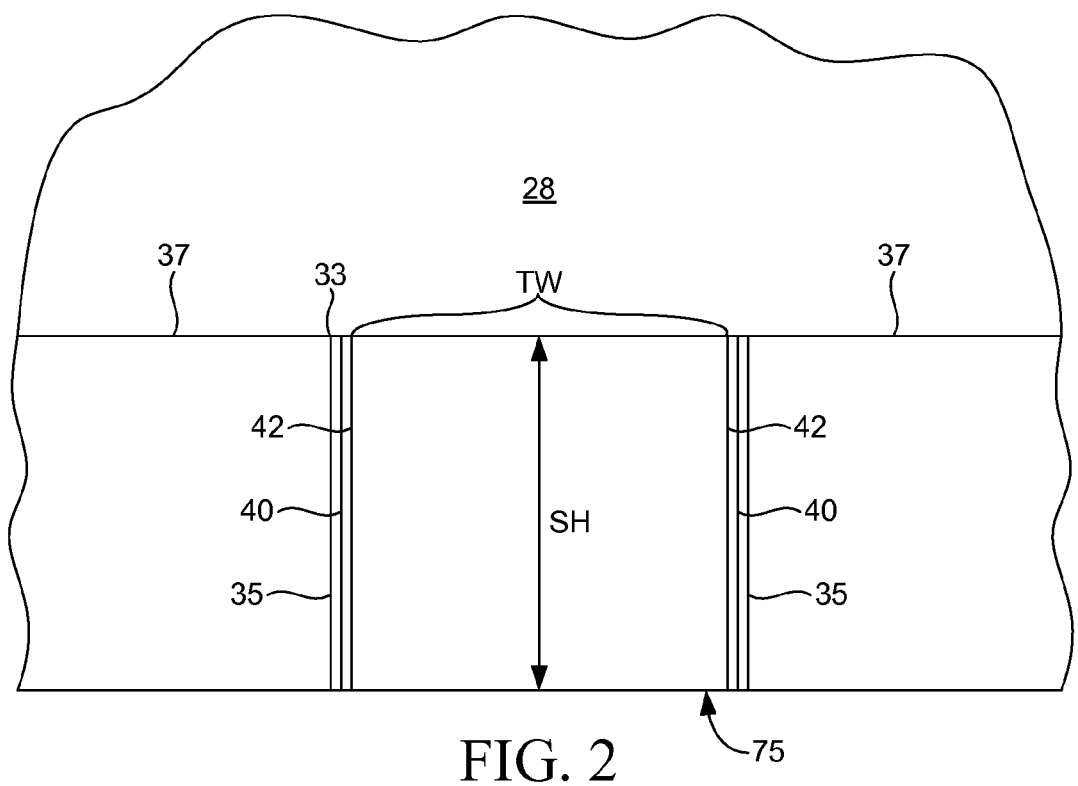
FIG. 2 is a cutaway opened-up view of some layers of the sensor of FIG. 1, as would be seen looking down from the top of FIG. 1.

FIG. 2 is a cutaway view of some layers of the sensor 20 of FIG. 1, as would be seen looking down from the top of FIG. 1, with the sensor opened-up to expose the free layer 42, spacer layer 40 and bias layer structure 33, including first section 35 and second section 37. A medium-facing surface 75 may optionally be coated with a hard protective coating, not shown. The free layer has a track-width (TW) dimension that may be in a range between about two hundred nanometers and twenty nanometers, and a stripe-height (SH) dimension that may be similar to the track-width dimension. The first section 35 has a track-width dimension that is nearly equal to that of the free layer 42, and the second section 37 extends further in the track-width direction, typically at least twice as far, as the first section. The second section 37 may optionally extend further than the first section 35 in the stripe height direction, but it preferably has a greater track-width dimension than stripe-height dimension, to geometrically encourage the magnetic moment of the bias structure to be oriented substantially parallel to the track-width direction. For example, the second section 37 may have a track-width dimension that is an order of magnitude greater than the stripe-height dimension, to maintain its magnetic moment in the track-width direction.

Figure 3:
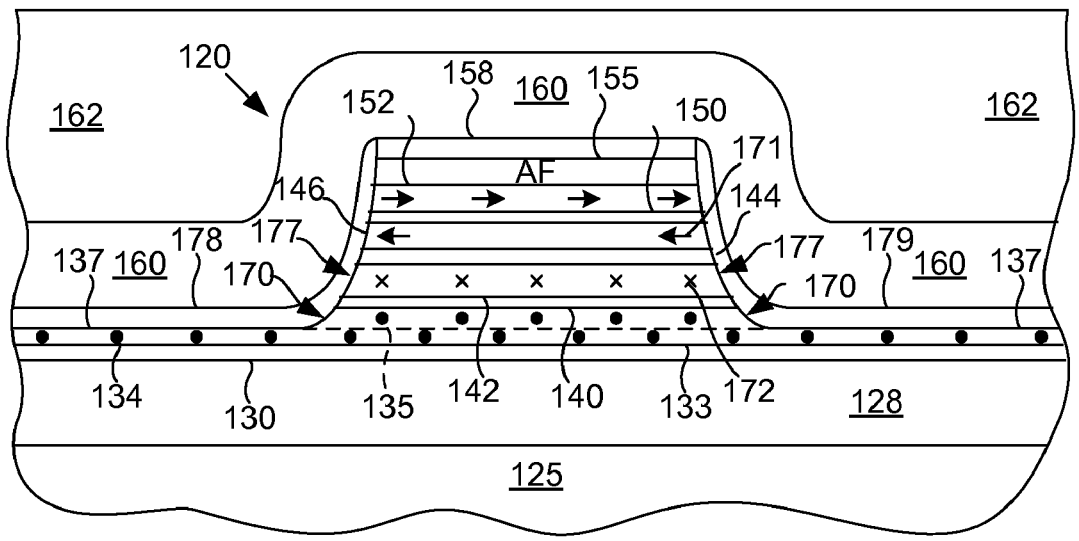
FIG. 3 is a cutaway cross-sectional view of a side shielded CPP sensor with a pinned layer that is pinned by a ferromagnetic structure having a first section with edges that are magnetostatically coupled to the ends of the pinned layer, and a second section that extends well beyond the pinned layer in the track-width direction.
Figure 4:
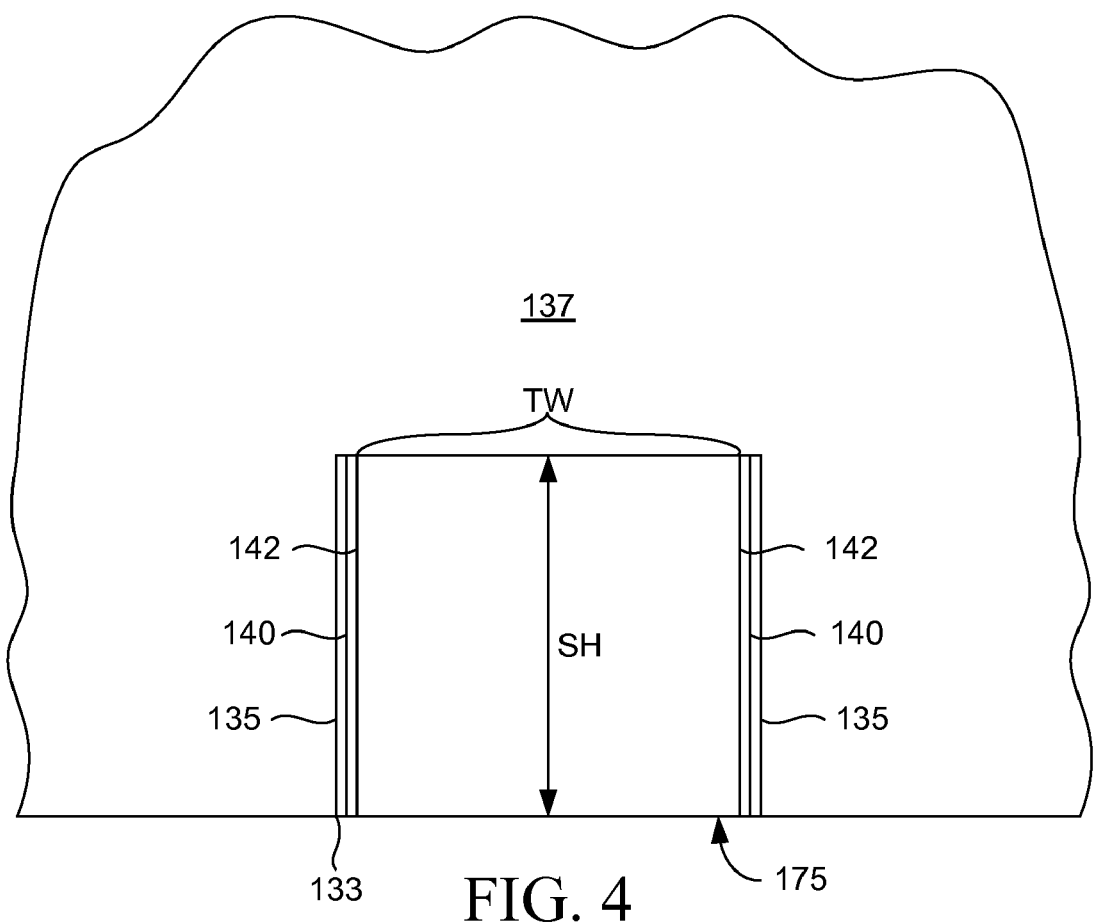
FIG. 4 is a cutaway opened-up view of some layers of the sensor of FIG. 3, as would be seen looking down from the top of FIG. 3.

FIG. 3 is a cutaway cross-sectional view of a side-shielded CPP sensor 120 as would be seen from an associated medium, looking through any thin protective coating that may cover the medium-facing surface of the sensor. The sensor 120 has a ferromagnetic layer 142 that is pinned by a ferromagnetic structure 133 having a first section 135 with edges 170 that are magnetostatically coupled to the ends 177 of the pinned layer, and a second section 137 that extends well beyond the pinned layer 146 in the track-width direction. As shown in FIG. 4, the second section 137 extends much further than the first section 135 in the stripe height direction as well. The increased area of the second section 137 stabilizes the magnetization of that section, reducing edge effects in the adjoining first section 135.

The sensor 120 has been formed in a number of thin film layers on a wafer substrate 125 along with thousands of other sensors, the substrate and layers diced to form individual sensors. A first shield 128 has been formed on the substrate 125 after the substrate has been polished and optionally covered with a surface layer, not shown. An electrically conductive, nonmagnetic layer 130 has been formed over the first shield 128, for example of Cu, Cr, Ta, other metals or alloys. The ferromagnetic structure 133 may have been formed as a layer atop the nonmagnetic layer 130, after which the first section 135 was defined by etching while the second section 137 was not trimmed by the etching. The ferromagnetic structure 133 may be made of hard magnetic material such as CoCr, CoCrPt, CoPtCrTa, etc., and has been initialized by a magnetic field to impart a magnetic moment that is directed substantially in the stripe-height direction, as depicted by dots 134. In an alternative embodiment the first section 135 and the second section 137 can be deposited as distinct layers. In this case, the first section may be formed of soft magnetic materials such as CoFe, NiFe, or other alloys or laminates, and the second section may be formed of hard magnetic materials such as CoCr, CoCrPt, CoPtCrTa, etc.

An electrically conductive, nonmagnetic coupling layer 140 has been formed, typically to thickness of about one nanometer, of ruthenium (Ru), chromium (Cr), rhodium (Rh), iridium (Ir), copper (Cu), or alloys of these metals, to strongly couple the first section 135 to the pinned layer 142, which has a magnetic moment directed oppositely to that of the first section, as indicated by crosses 172. The pinned layer 142 adjoins the spacer layer 140, and may be formed of soft magnetic materials such as CoFe, NiFe, or other alloys or laminates, to a thickness that may be in a range between about one nanometer and fifty nanometers. The pinned layer 142 may have a track-width dimension and thickness that are similar to those of the first section 135, to encourage magnetostatic coupling between the layer 142 and the section 135.

A nonferromagnetic spacer layer 144 has been formed atop the pinned layer 142, and a ferromagnetic free layer 146 has been formed atop the spacer layer 144. The spacer layer 144 may be made of a dielectric material, such as alumina, silicon-dioxide or aluminum-nitride, that forms a spin dependent tunnel barrier, in which case the thickness of the spacer layer may be in a range between about five angstroms and ten angstroms. Alternatively, the spacer layer 144 may be made of electrically conductive material that forms a spin valve, in which case the thickness may be in a range between about two nanometers and twenty nanometers. The spacer layer 144 may instead be made of electrically resistive material, or heterogeneous materials that have conductive regions interspersed with resistive or insulating regions, in which case the thickness may be in a range between about one nanometer and twenty nanometers.

The soft magnetic free layer 146 may be formed of soft magnetic materials such as CoFe, NiFe, or other materials or laminates, and may have a thickness that is in a range between about two nanometers and fifty nanometers. An electrically conductive, nonmagnetic spacer layer 150 has been formed atop the free layer, for example of Cu, Cr, Ta, etc., to a thickness that may be in a range between about one nanometer and twenty nanometers, over which a hard magnetic bias layer 152 has been formed with a magnetic moment in a track-width direction and opposite to that of the free layer, as indicated by arrows 171. Bias layer 152 may have a lower coercivity than that of the pinning structure 133, and may be formed of soft magnetic materials such as CoFe, NiFe, or other alloys or laminates. An antiferromagnetic (AF) layer 155, which may be formed, for example, of an alloy containing manganese (Mn), such as platinum-manganese (PtMn), adjoins the bias layer 152 to fix the magnetization of the bias layer. That is, the bias layer 152 magnetic moment can be set with a magnetic field having a strength that is above the coercivity of the bias layer but below the coercivity of the pinning structure 133, while the temperature is lowered from above the blocking temperature of the AF layer 155. An electrically conductive, nonmagnetic cap layer 158 has been formed, for example, of tantalum (Ta), to protect the previously formed layers and to magnetically isolate the AF layer 155 from a second soft magnetic shield 160.

After formation of the above-described layers, a lift-off mask was formed and the region not covered by the mask was removed by a highly anisotropic etch such as an ion beam etch (IBE) or reactive ion etch (RIE), to form a plateau-shaped stack of sensor layers. With the mask still present, insulating layers 178 and 179 were formed, for example of alumina or silicon dioxide, covering the bias layer structure 133 and the sides of the stack. The mask was then removed, along with any insulating material deposited atop the mask, and the second shield 160 was formed. Another layer of insulating material 162 was then formed and polished flat, after which an inductive write transducer may be formed. Note that the shields 128 and 160 may have a thickness on the order of one micron, and the shield-to-shield spacing, measured between outside surfaces of conductive layers 130 and 158, may be in a range between about two hundred nanometers and forty nanometers.

FIG. 4 is a cutaway view of some layers of the sensor 120 of FIG. 3, as would be seen looking down from the top of FIG. 3, with the sensor opened-up to expose the pinned layer 142, spacer layer 140 and pinning structure 133, including first section 135 and second section 137. A medium-facing surface 175 may optionally be coated with a hard protective coating, not shown. The pinned layer 142 has a track-width (TW) dimension that may be in a range between about two hundred nanometers and twenty nanometers, and a stripe-height (SH) dimension that may be similar to the track width. The first section 135 has a track-width dimension that is nearly equal to that of the pinned layer 142, and the second section 137 extends further in the track-width direction, typically at least twice as far, as the first section. The second section 137 also extends further than the first section 135 in the stripe-height direction, and may have a greater stripe-height dimension than track-width dimension, to geometrically encourage the magnetic moment of the pinning structure to be oriented substantially parallel to the stripe-height direction.

Figure 5:
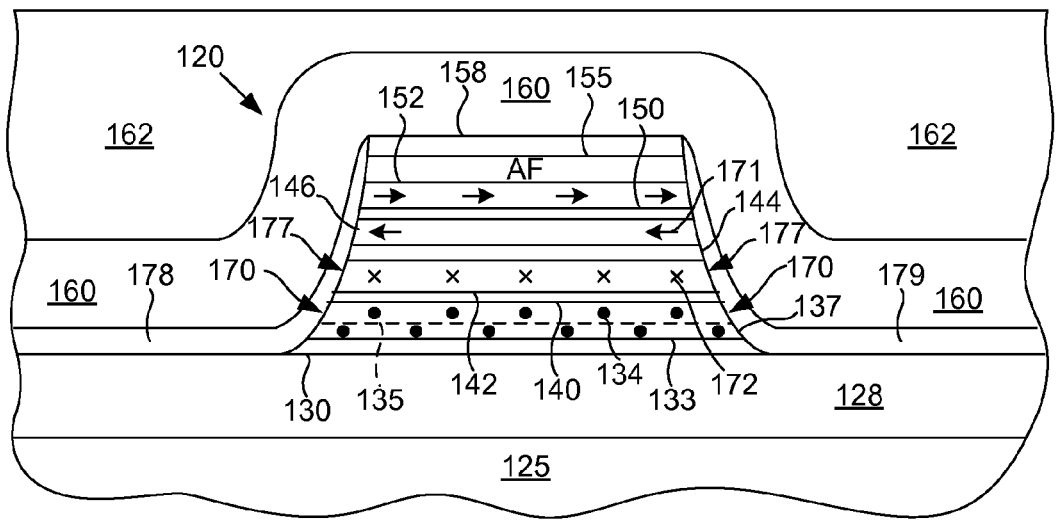
FIG. 5 is a cutaway cross-sectional view of a side shielded CPP sensor with a pinned layer that is pinned by a ferromagnetic structure having a first section with edges that are magnetostatically coupled to the ends of the pinned layer, and a second section that extends well beyond the pinned layer in the stripe-height direction.
Figure 6:
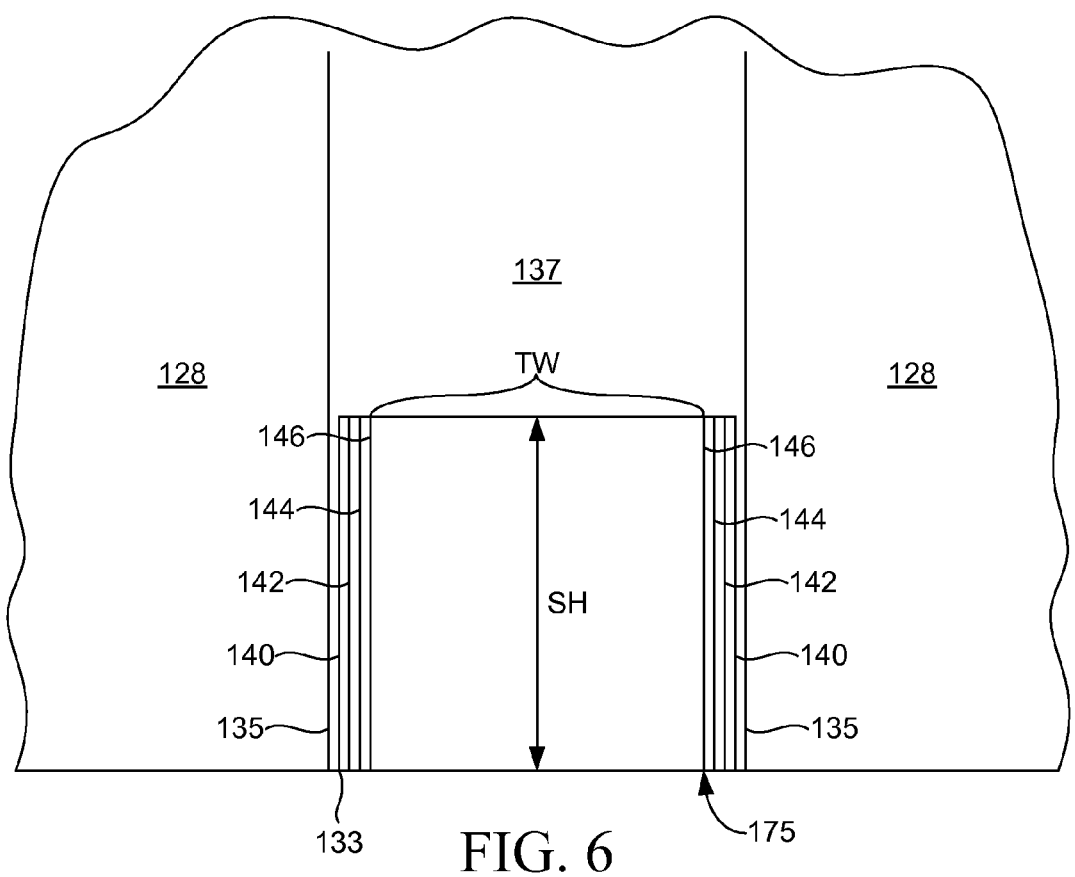
FIG. 6 is a cutaway opened-up view of some layers of the sensor of FIG. 5, as would be seen looking down from the top of FIG. 5.

FIG. 5 and FIG. 6 depict a side-shielded CPP sensor 120 similar to that described and depicted with reference to FIG. 3 and FIG. 4, however, the second section 137 of the sensor of FIG. 5 and FIG. 6 has a track-width dimension similar to that of the rest of the sensor stack. Having the second section elongated in the stripe-height dimension compared to the track-width dimension may geometrically encourage the magnetic moment of the pinning structure to be oriented substantially parallel to the stripe-height direction. For example, the second section 137 may have a stripe-height dimension that is an order of magnitude greater than its track-width dimension.

Figure 7:
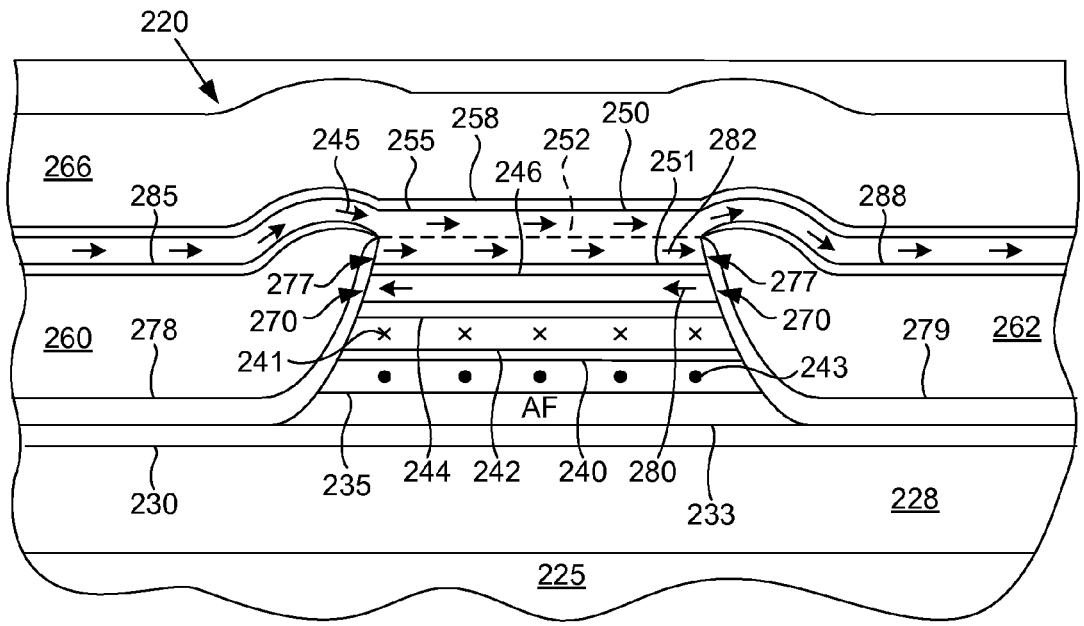
FIG. 7 is a cutaway cross-sectional view of a side shielded CPP sensor with a free layer that is biased by a ferromagnetic structure having a first layer with edges that are magnetostatically coupled to the ends of the free layer, and a second layer that extends substantially further than the free layer in the track-width direction.

FIG. 7 is a cutaway cross-sectional view of a side shielded CPP sensor 220 with a free layer 246 that is biased by a ferromagnetic structure 250 having a first layer 252 with edges 277 that are magnetostatically coupled to ends 270 of the free layer. The view of the sensor 220 in FIG. 7. is that which would be seen from an associated medium, looking through any thin protective coating that may cover the medium-facing surface. The ferromagnetic structure 250 has a second layer 255 that extends well beyond the free layer in a track-width direction that runs sideways in FIG. 7. The elongated shape of the second layer 255 geometrically stabilizes the magnetization of that layer in the track-width direction, reducing edge effects in the adjoining first layer 252.

The sensor 220 has been formed in a number of thin film layers on a wafer substrate 225 along with thousands of other sensors, the substrate and layers diced to form individual sensors. A first soft magnetic shield 228 has been formed on the substrate 225 after the substrate has been polished and optionally covered with a surface layer, not shown. An electrically conductive, nonmagnetic layer 230 has been formed over the first shield 228, for example of Cu, Cr, Ta, etc. An antiferromagnetic (AF) layer 233, which may be formed, for example, of an alloy containing manganese (Mn), such as platinum-manganese (PtMn), is disposed atop the nonmagnetic layer 230 to stabilize the magnetization of an adjoining hard magnetic pinning layer 235. A soft magnetic pinning layer 235 has been formed of soft magnetic materials such as CoFe, NiFe, etc. atop the AF layer, and the magnetization of the pinning layer initialized in the stripe-height direction, as indicated by dots 243. An electrically conductive nonmagnetic coupling layer 240 has been formed, typically to thickness of about one nanometer, of ruthenium (Ru), chromium (Cr), rhodium (Rh), iridium (Ir), copper (Cu), or alloys of these metals, to strongly couple a of soft magnetic pinned layer 242 to the pinning layer 235, with the magnetic moments of the pinned and pinning layers directed oppositely, as indicated by crosses 241 and dots 243.

A nonferromagnetic spacer layer 244 has been formed atop the pinned layer 242, with the soft magnetic free layer 246 formed atop the spacer layer 244. The spacer layer 244 may be made of a dielectric material, such as alumina, silicon-dioxide or aluminum-nitride, that forms a spin dependent tunnel barrier, in which case the thickness of the spacer layer may be in a range between about five angstroms and ten angstroms. Alternatively, the spacer layer 244 may be made of electrically conductive material that forms a spin valve, in which case the thickness may be in a range between about two nanometers and twenty nanometers. The spacer layer 244 may instead be made of electrically resistive material, or heterogeneous materials that have conductive regions interspersed with resistive or insulating regions, in which case the thickness may be in a range between about one nanometer and twenty nanometers.

The free layer 246 adjoins the spacer layer 244, and may be formed, for example of NiFe, CoFe, or other materials or laminates, to a thickness that may be in a range between about one nanometer and fifty nanometers. The free layer 246 may have a track-width dimension and thickness that are similar to those of the first section 252, to encourage magnetostatic coupling between the layers 252 and 246. An electrically conductive nonmagnetic coupling layer 251 may be formed to strongly couple the free layer 246 to the bias structure 250. The first layer 252 of the bias structure 250 may be formed of soft magnetic materials such as permalloy or hard magnetic materials such as cobalt-based alloys, may have a thickness that is in a range between about two nanometers and fifty nanometers.

After formation of the above-described layers, a lift-off mask was formed and the region not covered by the mask was removed by a highly anisotropic etch such as an ion beam etch (IBE) or reactive ion etch (RIE), to form a plateau-shaped stack of sensor layers. With the mask still present, insulating layers 278 and 279 were formed, for example of alumina or silicon dioxide, covering the first shield 228 and the sides of the stack. Second and third soft magnetic shield layers 260 and 262 were then formed to shield the free layer 246 in the track-width direction. Electrically insulating layers 285 and 288 were then formed, for example of alumina or silicon dioxide, covering the side shields 260 and 262.

The mask was then removed, along with any insulating material and shield material deposited atop the mask, and the second layer 255 of the ferromagnetic bias structure 250 was formed, adjoining the first layer 252 and separated from the side shields 260 and 262 by the insulating layers 285 and 288. The second layer 255 of the bias structure 250 may have a lower coercivity than that of the pinning structure 235, and may have its magnetic moment set with a magnetic field having a strength that is above the coercivity of the second layer but below the coercivity of the pinning structure. The second layer 255 may be initialized by a magnetic field to impart a magnetic moment directed substantially opposite to that of the free layer 246, as indicated by arrows 245, 280, and 282. An electrically conductive, nonmagnetic layer 258 was formed over layer 255, after which a fourth soft magnetic shield 266 was formed. Note that the shields 228 and 266 may have a thickness on the order of one micron, and the shield-to-shield spacing, measured between outside surfaces of conductive layers 230 and 258, may be in a range between about two hundred nanometers and forty nanometers.

Figure 8:
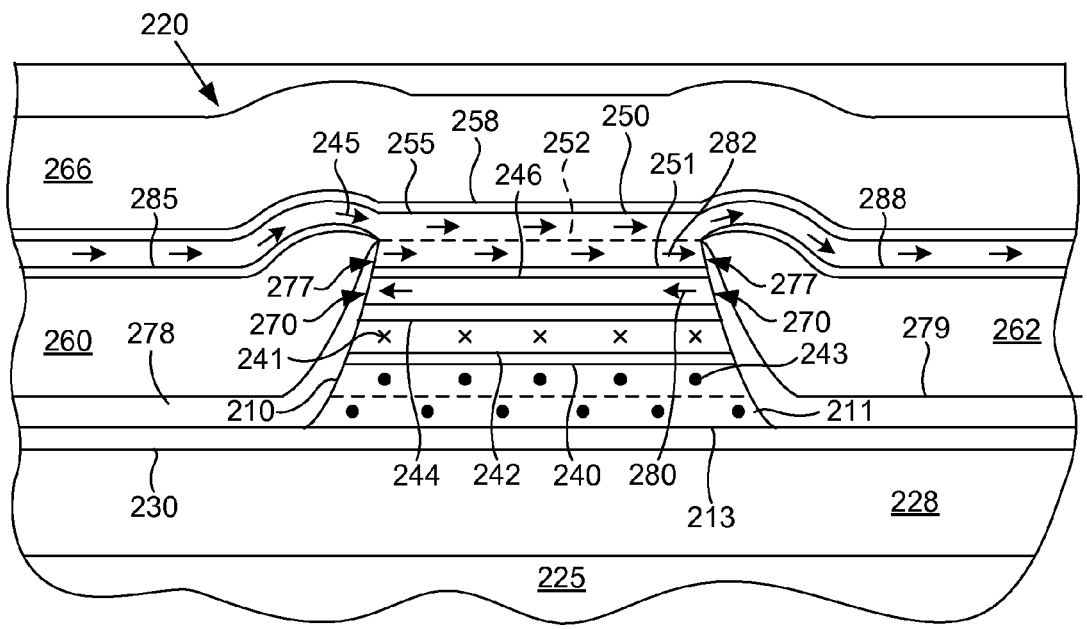
FIG. 8 is a cutaway cross-sectional view of a side shielded CPP sensor with a free layer that is biased similarly to the sensor of FIG. 7, and having a pinned layer that is pinned by a ferromagnetic structure having a first section with edges that are magnetostatically coupled to the ends of the pinned layer, and a second section that extends well beyond the pinned layer in the track-width direction.

FIG. 8 depicts a side-shielded CPP sensor 220 similar to that described and depicted with reference to FIG. 7, however, the AF layer 233 and hard magnetic pinning layer 235 of FIG. 7 have been replaced with a hard magnetic pinning structure 213 in FIG. 8. The hard magnetic pinning structure 213 includes a first section 210 that is coupled to the pinned layer 242 by subnanometer coupling layer 240, and a second section 211 that extends substantially the same amount as the first section 210 in the track-width direction, but much further than first section 210 in the stripe-height direction, similar to section 137 that was depicted in FIG. 6. The elongated stripe-height dimension of the second section 211 geometrically stabilizes the magnetization of that section in the stripe-height direction, reducing edge effects in the adjoining first section 210.

The sensor 220 of FIG. 8 has been formed without any AF layer for pinning, providing a number of advantages. First, AF material is typically the most resistive material in a CPP sensor, aside from material that may be found in the nonmagnetic spacer between the free and pinned layers, which can increase the change in resistance resulting from an applied magnetic field. Therefore, the absence of AF material decreases the underlying resistance of the sensor, making the change in resistance more pronounced compared to the underlying resistance, increasing the magnetoresistance ($\Delta R/R$). Second, it is difficult to find AF materials with adequate blocking temperatures, so the interfacial coupling between an AF layer and adjoining ferromagnetic layer may be denigrated during formation of other sensor layers at elevated temperatures and magnetic fields. These problems may be compounded for sensors that are proposed to have two AF layers.

Moreover, it is possible to reduce the underlying resistance further in accordance with one embodiment, by eliminating the synthetic antiferromagnetic structure of pinned and pinning layers strongly coupled about a subnanometer conductive spacer, the synthetic AF structure otherwise requiring electrons to flip their spin in traveling across the spacer in a CPP mode. To accomplish this reduced underlying resistance, a simplified magnetic structure may include a soft magnetic free layer that extends in a first direction a first distance, an electrically conductive nonmagnetic spacer layer that adjoins the free layer and extends in the first direction a second distance that is substantially equal to the first distance, and a hard magnetic structure that is separated from the ferromagnetic layer by the spacer layer, the hard magnetic structure having a pinned section that extends in the first direction a third distance that is substantially equal to the second distance, the hard magnetic structure having a pinning section that is disposed further than the pinned section from the spacer layer, the pinning section extending at least twice as far as the pinned section in the first direction. Should the spacer layer be dielectric rather than conductive, the structure may be used for a magnetoresistive random access memory (MRAM) cell.

Figure 9:
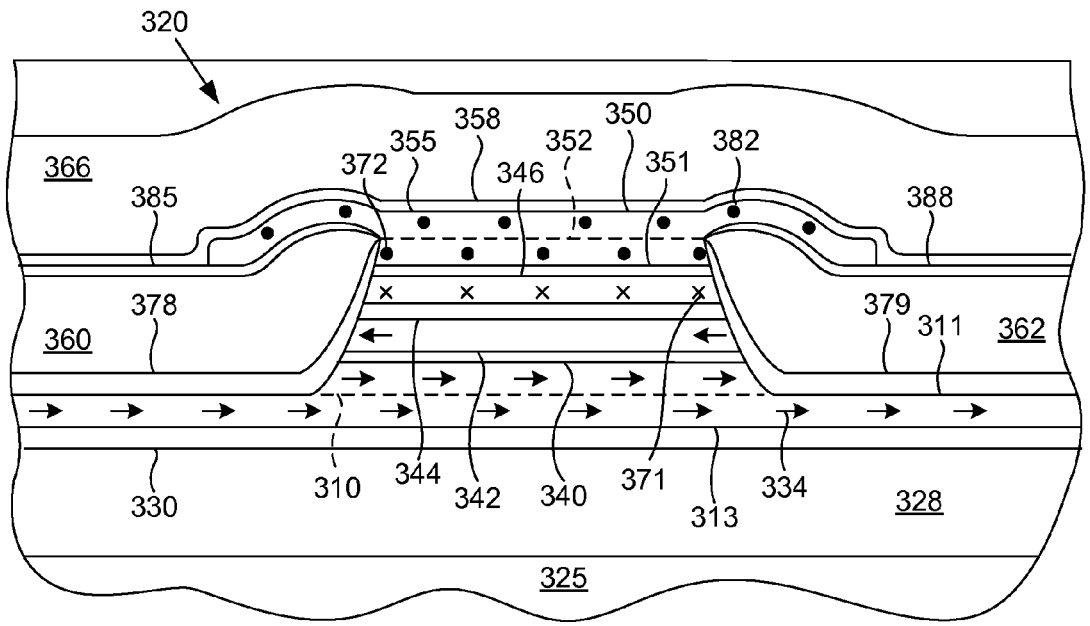
FIGS. 9 and 11 are, respectively, a cutaway cross-sectional view and a view of selected layers of a side-shielded CPP sensor similar to that of FIG. 1, but with a ferromagnetic pinning structure with a first section and a second section, the second section extending much further than the first section in the stripe-height direction.
Figure 10:
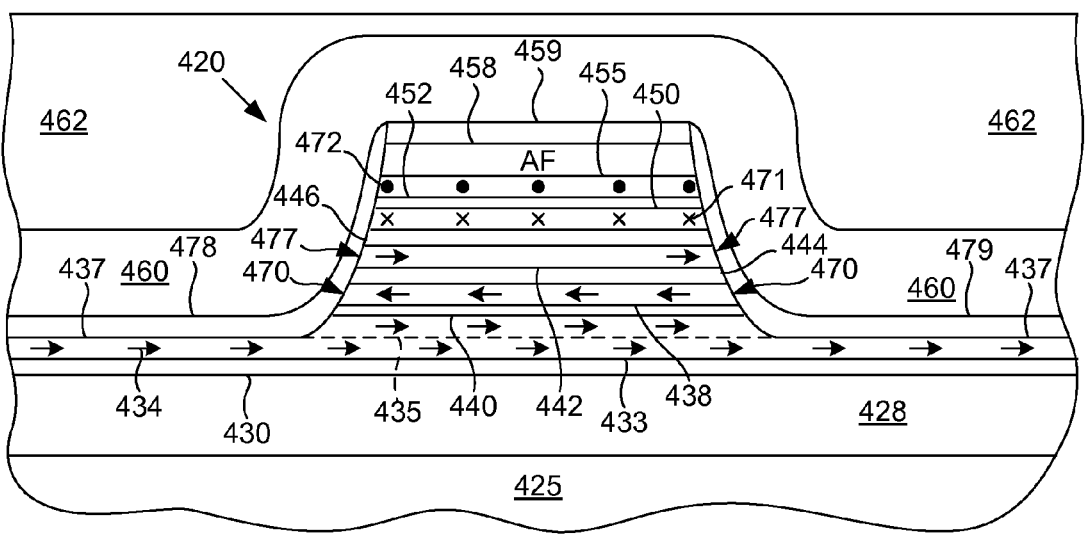
FIG. 10 is a cutaway cross-sectional view of a side shielded CPP sensor similar to that of FIG. 1, but with a bias layer that is antiparallel exchange coupled to a first section of a ferromagnetic structure having a second section that extends well beyond the first section in a track-width direction.

FIG. 9 depicts a side-shielded CPP sensor 320 similar to that described and depicted with reference to FIG. 8, however, the sensor of FIG. 10 has a free layer 342 and associated ferromagnetic bias structure 313 that were formed before a pinned layer 346 and associated ferromagnetic pinning structure 350. The view of the sensor 320 is that which would be seen from an associated medium, looking through any thin protective coating that may cover the medium-facing surface. The sensor 320 has been formed in a number of thin film layers on a wafer substrate 325 along with thousands of other sensors, the substrate and layers diced to form individual sensors. A first shield 328 has been formed on the substrate 325 after the substrate has been polished and optionally covered with a surface layer, not shown. An electrically conductive, nonmagnetic layer 330 has been formed over the first shield 328, for example of Cu, Cr, Ta, etc.

The ferromagnetic bias structure 313 was formed as a layer atop the nonmagnetic layer 330, after which a first section 310 of the bias structure 313 was defined by etching while a second section 311 was not trimmed by the etching. The ferromagnetic structure 313 may be made of hard magnetic material such as a cobalt-based alloy, which was exposed to a magnetic field to impart a magnetic moment that is directed substantially in the track-width direction, as depicted by arrows 334. In an alternative embodiment the first section 310 and the second section 311 can be deposited as distinct layers. In this case, the first section may be formed of soft magnetic materials such as CoFe, NiFe, or other alloys or laminates, and the second section may be formed of hard magnetic materials such as CoCr, CoCrPt, CoPtCrTa, etc.

An electrically conductive, nonmagnetic spacer layer 340 has been formed atop the ferromagnetic structure 313, for example of Cu, Cr, Ta, etc., to a thickness that may be in a range between about one nanometer and twenty nanometers. The free layer 342 adjoins the spacer layer 340, and may be formed, for example of CoFe, NiFe, or other materials or laminates, to a thickness that may be in a range between about one nanometer and fifty nanometers. The free layer 342 may have a track-width dimension and thickness that are similar to those of the first section 310, to encourage magnetostatic coupling between the layer 342 and the section 310.

A nonferromagnetic spacer layer 344 has been formed atop the free layer 342, and a ferromagnetic pinned layer 346 has been formed atop the spacer layer 344. The spacer layer 344 may be made of a dielectric material, such as alumina, silicon-dioxide or aluminum-nitride, that forms a spin dependent tunnel barrier, in which case the thickness of the spacer layer may be in a range between about five angstroms and ten angstroms. Alternatively, the spacer layer 344 may be made of electrically conductive material that forms a spin valve, in which case the thickness may be in a range between about two nanometers and twenty nanometers. The spacer layer 344 may instead be made of electrically resistive material, or heterogeneous materials that have conductive regions interspersed with resistive or insulating regions, in which case the thickness may be in a range between about one nanometer and twenty nanometers.

The pinned layer 346 may have a magnetic moment directed in a stripe-height direction, as indicated by crosses 371. Pinned layer 346 may be formed of soft magnetic materials such as CoFe, NiFe, or other materials or laminates, and may have a thickness that is in a range between about two nanometers and fifty nanometers. An electrically conductive nonmagnetic coupling layer 351 has been formed, typically to thickness of about one nanometer, of ruthenium (Ru), chromium (Cr), rhodium (Rh), iridium (Ir), copper (Cu), or alloys of these metals, to strongly couple the pinned layer 346 to a hard magnetic pinning layer 352, which has a magnetic moment directed oppositely to that of the pinned layer, as indicated by dots 372. The pinned layer 346 may have a track-width dimension and thickness that are similar to those of the pinning layer 346, to encourage magnetostatic coupling between the layers 352 and 346.

After formation of the above-described layers, a lift-off mask was formed and the region not covered by the mask was removed by a highly anisotropic etch such as an ion beam etch (IBE) or reactive ion etch (RIE), to form a plateau-shaped stack of sensor layers. With the mask still present, insulating layers 378 and 379 were formed, for example of alumina or silicon dioxide, covering the second section 311 of the bias layer structure 313 and the sides of the stack. Second and third soft magnetic shield layers 360 and 362 were then formed to shield the free layer 342 in the track-width direction. Electrically insulating layers 385 and 388 were then formed, for example of alumina or silicon dioxide, covering the side shields 360 and 362.

Figure 11:
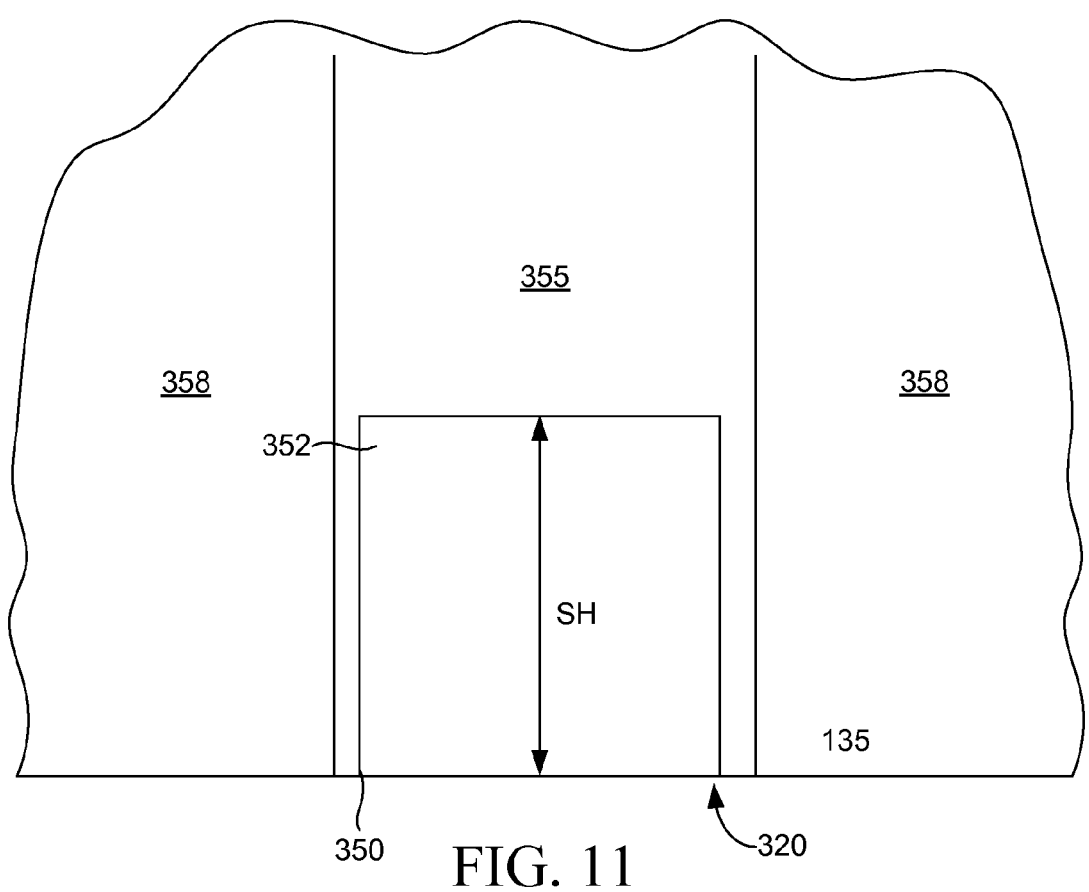

The mask was then removed, along with any insulating material and shield material deposited atop the mask, and another mask formed with a stripe-shaped opening centered over the pinned layer 352 and extending in the stripe-height direction. The second layer 355 of the ferromagnetic pinning structure 350 was formed through the stripe-shaped opening, adjoining the first layer 352 and separated from the side shields 360 and 362 by the insulating layers 385 and 388. Second layer 355 may have a lower coercivity than that of the bias structure 313, and may have its magnetic moment, shown by dots 382, set with a magnetic field having a strength that is above the coercivity of the second layer 355 but below the coercivity of the bias structure 313. The elongated stripe-height dimension of the second layer 355, shown in the view of the ferromagnetic pinning structure 350 from the plane of the spacer layer 346 as depicted in FIG. 11, geometrically stabilizes the magnetization of that layer in the stripe-height direction, reducing edge effects in the adjoining first layer 352.

An electrically conductive, nonmagnetic layer 358 was formed over layers 355, 385 and 388, after which another soft magnetic shield 366 was formed. Note that the shields 328 and 366 may have a thickness on the order of one micron, and the shield-to-shield spacing, measured between outside surfaces of conductive layers 330 and 358, may be in a range between about two hundred nanometers and forty nanometers.

FIG. 10 is a cutaway cross-sectional view of a magnetic sensor 420 designed to have current flowing between a first soft magnetic shield 428 and a second soft magnetic shield 460, i.e., in a CPP mode. The view of the sensor 420 is that which would be seen from an associated medium, looking through any thin protective coating that may cover the medium-facing surface. The second shield 460 overlaps a plurality of sensor layers including a soft magnetic free layer 442 to provide shielding for the free layer in a track-width as well as a track-length direction. A ferromagnetic bias structure 433 has a first section 435 that is exchange coupled in an antiparallel mode to a bias layer 438 by an electrically conductive, nonferromagnetic coupling layer 440, and a second section 437 that extends well beyond those edges in a track-width direction that is oriented generally sideways in FIG. 1. The bias layer 438 has a pair of edges 470 that are magnetostatically coupled to a pair of ends 477 of the free layer 442. The elongated shape of the second section 437 geometrically stabilizes the magnetization of that section in the track-width direction, and reduces edge effects in the adjoining first section 435 and coupled bias layer 438.

The sensor 420 has been formed in a number of thin film layers on a wafer substrate 425 along with thousands of other sensors, the substrate and layers diced to form individual sensors. The first shield 428 has been formed on the substrate 425 after the substrate has been polished and optionally covered with a surface layer, not shown. An electrically conductive, nonmagnetic layer 430 has been formed over the first shield 428, for example of Cu, Cr, Ta, Al, etc. The ferromagnetic structure 433 was formed as a layer atop the nonmagnetic layer 430, after which the first section 435 was defined by etching while the second section 437 was not trimmed by the etching. The ferromagnetic structure 433 may be made of hard magnetic material such as a cobalt-based alloy, and may be deposited at an elevated temperature in the presence of a magnetic field to impart a favorable crystallographic structure. The ferromagnetic structure 433 may be initialized at lower temperature such as room temperature by imposing a strong magnetic field that is directed substantially in the track-width direction, to impart a magnetic moment as depicted by arrows 434. In an alternative embodiment the first section 435 and the second section 437 can be deposited as distinct layers. In this case, the first section may be formed of soft magnetic materials such as CoFe, NiFe, or other alloys or laminates, and the second section may be formed of hard magnetic materials such as CoCr, CoCrPt, CoPtCrTa, etc.

The coupling layer 440 has been formed atop the ferromagnetic structure 433, for example of Cu, Cr, Ta, etc., to a thickness that may be in a range between about five angstroms and two nanometers. The bias layer 438 adjoins the coupling layer 440 and may be formed of hard or soft magnetic material. An electrically conductive, nonferromagnetic spacer layer 444 separates the bias layer 438 from the free layer 442, the spacer layer 444 formed, for example Cu, Cr, Ta, etc., to a thickness that may be in a range between about one nanometer and twenty nanometers. The free layer 442 may have a track-width dimension and thickness that are similar to those of the bias layer 438, and may be formed of alloys such as nickel iron (NiFe), cobalt iron (CoFe) or plural layers of such alloys.

A nonferromagnetic spacer layer 446 has been formed atop the free layer 442, and a ferromagnetic pinned layer 450 has been formed atop the spacer layer 446. The spacer layer 446 may be made of a dielectric material, such as alumina, silicon-dioxide or aluminum-nitride, that forms a spin dependent tunnel barrier, in which case the thickness of the spacer layer may be in a range between about five angstroms and ten angstroms. Alternatively, the spacer layer 446 may be made of electrically conductive material that forms a spin valve, in which case the thickness may be in a range between about two nanometers and twenty nanometers. The spacer layer 446 may instead be made of electrically resistive material, or heterogeneous materials that have conductive regions interspersed with resistive or insulating regions, in which case the thickness may be in a range between about one nanometer and twenty nanometers.

The pinned layer 450 may be formed of soft magnetic materials such as NiFe, and may have a thickness that is in a range between about two nanometers and fifty nanometers. Pinned layer 450 may have a magnetic moment directed in a stripe-height direction, as indicated by crosses 471. An electrically conductive nonmagnetic coupling layer 452 has been formed, typically to thickness of about one nanometer, of ruthenium (Ru), chromium (Cr), rhodium (Rh), iridium (Ir), copper (Cu), or alloys of these metals, to strongly couple the pinned layer 450 to a hard magnetic pinning layer 455, which has a magnetic moment directed oppositely to that of the pinned layer, as indicated by dots 472. An antiferromagnetic (AF) layer 458, which may be formed, for example, of an alloy containing manganese (Mn), such as platinum-manganese (PtMn), adjoins the pinning layer 455 to stabilize the magnetization of the pinning layer. The AF layer may be heated to above its blocking temperature, before cooling to pin the moments of the pinning layer 455 and pinned layer 450 by exchange coupling. An electrically conductive, nonmagnetic cap layer 459 has been formed, for example, of tantalum (Ta), to protect the previously formed layers and to magnetically isolate the AF layer 458 from the second shield 460.

After formation of the above-described layers, a lift-off mask was formed and the region not covered by the mask was removed by a highly anisotropic etch such as an ion beam etch (IBE) or reactive ion etch (RIE), to form a plateau-shaped stack of sensor layers. With the mask still present, insulating layers 478 and 479 were formed, for example of alumina or silicon dioxide, covering the bias layer structure 433 and the sides of the stack. The mask was then removed, along with any insulating material deposited atop the mask, and the second shield 60 was formed. Another layer of insulating material 462 was then formed and polished flat, after which an inductive write transducer may be formed. Note that the shields 428 and 460 may have a thickness on the order of one micron, and the shield-to-shield spacing, measured between outside surfaces of conductive layers 430 and 459, may be in a range between about two hundred nanometers and forty nanometers.

Although the above embodiments were described primarily in the context of a magnetic sensor for information storage and retrieval systems, the novel magnetic structures disclosed herein can be used in a variety of situations. For example, such structures can be used in MRAM or other computer applications. Such structures can also be used for sensing mechanical positioning, for example in automobile applications. Such a structure can also be used for sensing magnetic fields, for example in measurement and testing applications.

The invention claimed is:

1. A magnetic sensor comprising:
a plurality of sense layers, including a ferromagnetic pinned layer that has a magnetization that is stable in response to an applied magnetic field, a soft magnetic free layer that has a magnetization that rotates in response to the applied magnetic field, and a nonferromagnetic spacer layer that separates the pinned layer from the free layer, the free layer extending between two ends in a track-width direction; and
a ferromagnetic pinning structure that has a first section extending a first distance in a stripe-height direction that is perpendicular to the track-width direction such that the first section is antiferromagnetically coupled to the pinned layer by a nonmagnetic metal layer, the pinning structure having a second section that is separated from the metal layer by the first section, the second section extending a second distance in the stripe-height direction, wherein the second distance is at least twice the first distance; and
a ferromagnetic bias layer structure that is separated from the free layer by an electrically conductive nonmagnetic layer, the bias layer structure having a first part extending between two edges in the track-width direction such that the ends of the free layer are magnetically coupled to the edges of the first part, the bias layer structure having a second part that is separated from the electrically conductive, nonmagnetic layer by the first part, the second part extending at least twice as far as the first part in the track-width direction.

2. The sensor of claim 1, further comprising a soft magnetic shield that is separated from the second section by a nonferromagnetic layer.

3. The sensor of claim 1, further comprising a soft magnetic shield that is disposed adjacent to the free layer, such that a line that intersects the free layer and is parallel to the track-width direction intersects the shield.

4. The sensor of claim 3, wherein the shield is separated from the first section by a nonferromagnetic insulating layer.

5. The sensor of claim 3, wherein the shield surrounds the free layer in the track-width direction.

6. The sensor of claim 1, wherein the first section includes a first magnetic layer and the second section includes a second magnetic layer.

7. The sensor of claim 1, wherein the metal layer contains ruthenium, chromium, rhodium, iridium or copper, and has a thickness that is less than two nanometers.

8. The sensor of claim 1, further comprising a soft magnetic shield that is separated from the free layer by a nonferromagnetic layer.

9. The sensor of claim 1, wherein the spacer layer is electrically conductive.

10. The sensor of claim 1, wherein the spacer layer includes a plurality of heterogeneous materials.

11. The sensor of claim 1, wherein the spacer layer is made of dielectric material.

* * * * *